United States Patent [19]

Yagi et al.

[11] 4,279,769

[45] Jul. 21, 1981

[54] BLEACHING COMPOSITION

[75] Inventors: Kouichi Yagi, Tokyo; Yunosuke Nakagawa, Soka, both of Japan

[73] Assignee: Kao Soap Co., Ltd., Tokyo, Japan

[21] Appl. No.: 20,275

[22] Filed: Mar. 14, 1979

[30] Foreign Application Priority Data

Mar. 20, 1978 [JP] Japan ................................ 53-31922

Dec. 22, 1978 [JP] Japan ................................ 53-159624

[51] Int. Cl.[3] ...................... C01B 15/10; C11D 3/395; C11D 7/56

[52] U.S. Cl. ....................................... 252/186; 8/111; 252/95; 252/99; 423/273; 423/415 P

[58] Field of Search .............. 252/186, 95, 99; 8/111; 423/273, 415 P

[56] References Cited

U.S. PATENT DOCUMENTS

| | | | |
|---|---|---|---|
| 3,737,385 | 6/1973 | Wardehausen | 252/99 |
| 3,982,892 | 9/1976 | Gray | 252/186 |
| 4,008,167 | 2/1977 | Wakagawa et al. | 252/186 |
| 4,131,562 | 12/1978 | Lutz et al. | 252/186 |

*Primary Examiner*—Edward A. Miller
*Assistant Examiner*—Irwin Gluck
*Attorney, Agent, or Firm*—Blanchard, Flynn, Thiel, Boutell & Tanis

[57] ABSTRACT

A bleaching composition comprising (A) sodium percarbonate and/or tetrasodium ethane-1,1,2,2-tetracarboxylate/hydrogen peroxide adduct, and (B) dicarboxyalkyleneimino, monocarboxyalkyleneiminobis(alkylene phosphonic acid), hydroxyethylimino diacetate and/or hydroxyethylethylenediamine triacetate compounds. The composition minimizes color change or fading of colored fabrics caused by bleaching.

12 Claims, No Drawings

BLEACHING COMPOSITION

The present invention relates to a bleaching composition which is suitable for safely bleaching, both colored cloths and figured cloths.

In domestic and industrial bleaching processes, an oxidation reaction is utilized in general and, in most cases, chlorine bleaching agents are used. Although chlorine bleaching agents are useful, the fibers and fabrics for which those chlorine bleaching agents can safely be used are limited. Further, they cannot be used for bleaching colored cloths and figured cloths because of a fear of causing decolorization and color change. Development of bleaching agents usable for all fibers and fabrics and capable of bleaching colored and figured cloths has been demanded and oxygen-containing bleaching agents have been widely suggested recently. The oxygen-containing bleaching agents are put on the market either as a bleaching composition comprising only the oxygen-containing bleaching agent or as a bleaching detergent composition comprising a mixture of the oxygen-containing bleaching agent and detergent component which has both deterging and bleaching effects.

As compared with chlorine bleaching agents, the oxygen-containing bleaching agents are used at a higher temperature, since the latter bleaching agents have an inferior bleaching effect at a lower temperature. Sodium perborate is most generally used among the oxygen-containing bleaching agents. However, sodium perborate has the following problems:

(a) low water-solubility at a low temperature,
(b) influence on the environment of its decomposition products after it has been used,
(c) resources, and
(d) poor amount of available oxygen per unit weight.

The oxygen bleaching agents include peroxy compounds such as sodium percarbonate, sodium perborate, sodium peroxytripolyphosphate, sodium peroxypyrophosphate, hydrogen peroxide adduct of sodium sulfate/sodium chloride and tetrasodium ethane-1,1,2,2-tetracarboxylate/hydrogen peroxide adduct.

Under the circumstances set forth above, sodium percarbonate and tetrasodium ethane-1,1,2,2-tetracarboxylate/hydrogen peroxide adducts have attracted attention and sodium percarbonate has already been put into practice.

However, it has been found that colored and figured cloths are discolored or faded even if they are treated with an aqueous bleaching composition solution of a low concentration (such as 0.3 wt. %) in the bleaching treatment of colored and figured cloths and fibers with a bleaching composition containing, as a main ingredient, sodium percarbonate or a tetrasodium ethane-1,1,2,2-tetracarboxylate/hydrogen peroxide adduct. In the bleaching treatment carried out for a long period of time, the degree of discoloration or fading is particularly high when an incompletely dissolved bleaching composition in the form of powders or granules is contacted directly with the colored and figured fabrics and fibers.

In the use of oxygen-containing bleaching agents, various ideas have been proposed for stabilizing peroxides in an aqueous bleaching agent solution, preventing reduction in the activity of a fluorescent brightening agent and preventing embrittlement of the fabrics and fibers. The developments comprise, for example, addition of a chelating agent (British Pat. No. 1,060,849) and addition of a magnesium salt (U.S. Pat. No. 2,160,391). Although those techniques were developed for the oxygen-containing bleaching agents to be applied to the prevention of colored and figured fabrics from discoloration or fading, the intended effects could not be obtained at all or only insufficient effects were obtained.

For preventing this phenomenon, there have been also proposed processes wherein alanine, lysine, adenine, acetylaminoacetic acid, phenylalanine, arginine, tyrosine, aminobutyric acid, glyoxaloxime, salicylaldoxime, α-nitroso-β-naphthol, 8-hydroxyquinoline, cupferron and anthranilic acid are used. However, the effects of those processes are not excellent. The effects are unsatisfactory when the colored and figured cloths are domestically bleached with them repeatedly.

Although it is convenient to incorporate those additives in the bleaching composition in view of the ease of use, their incorporation causes the defects that the composition is colored or emits an offensive smell and the composition becomes useless due to its poor resistance to deterioration with lapse of time. Thus, development of novel techniques has been demanded.

After intensive investigations on the prevention of discoloration and fading of colored and figured fabrics due to sodium percarbonate and tetrasodium ethane-1,1,2,2-tetracarboxylate/hydrogen peroxide adduct, the inventors have found the facts described below. The present invention has been attained on the basis of these findings.

The discoloration and fading of colored and figured fabrics are remarkable when an incompletely dissolved bleaching agent is contacted directly with the fabrics. Dyestuffs used for the colored and figured fabrics, thus discolored or faded, were analyzed and it was found that they contain transition metal elements, particularly copper. Copper is used for a dye matrix for imparting a clear color tone to a reactive dyestuff of a high fastness to wetting. Further, in case a metal-containing or non-metal direct cotton dyestuff, applied according to dip dyeing process, is used, the fabrics are generally treated with a non-metal or metal-containing fixing agent or with a metal salt for improving the fastness thereof to wetting or light. As the metal, copper is used mainly.

It is considered that the metals contained in the thus dyed colored and figured fabrics react catalytically with hydrogen peroxide in the bleaching treatment liquid to form active reactants from hydrogen peroxide, thereby causing discoloration and fading of the colored and figured fabrics.

It has been found that, surprisingly, the discoloration and fading of colored and figured fabrics and fibers caused in the bleaching with sodium percarbonate or tetrasodium ethane-1,1,2,2-tetracarboxylate/hydrogen peroxide adduct can be prevented by incorporating therein a compound of following formula (I) or (II):

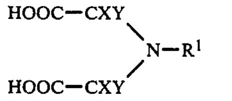
(I)

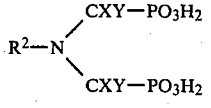
(II)

wherein X and Y each represent hydrogen atom or an alkyl group of 1–5 carbon atoms, $R^1$ represents an alkyl group of 1–5 carbon atoms, an acyl group of 1–5 carbon atoms or a phosphonoalkylene group of 1–5 carbon atoms, $R^2$ represents a carboxyalkylene group of 1–5 carbon atoms in which the carboxylic acid residue or phosphonic acid residue may be its alkali metal salt, alkaline earth metal salt, ammonium salt or alkylolamine salt having an alkyl group of 2–3 carbon atoms.

As representative compounds of formulae (I) and (II), there may be mentioned, for example, methyliminodiacetic acid, phosphonomethyliminodiacetic acid, phosphonoethyliminodiacetic acid, acetamidonitrilodiacetic acid, carboxyethyliminobis(methylenephosphonic acid) and carboxymethyliminobis(methylenephosphonic acid) as well as alkali metal salts and alkaline earth metal salts of them and mono-, di- and trialkylolamine salts (the alkyl group having 2 or 3 carbon atoms) of them. The most preferred compounds of formulae (I) and (II) are those wherein X and Y represent hydrogen atoms.

With any of compounds of said formulae (I) and (II), the object of the present invention can be attained satisfactorily. By incorporating those compounds either alone or in the form of a mixture in sodium percarbonate and/or tetrasodium ethane-1,1,2,2-tetracarboxylate/hydrogen peroxide adduct and then mixing the resulting mixture with substances to be contained in a usual bleaching composition and bleaching detergent composition, the bleaching composition of the present invention, which is capable of bleaching the colored and figured fabrics and fibers safely without causing discoloration or fading, can be obtained.

The present inventors have furthermore found that a compound of the following formula (III) is also effective in the bleaching composition according to the invention.

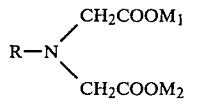

(III)

wherein R represents $HOCH_2CH_2$— or

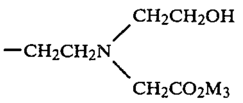

and $M_1$, $M_2$ and $M_3$ represent an alkali metal or an alkaline earth metal separately or together.

Compounds of formulae (I), (II) and (III) have specific actions.

Compounds of general formula (I), (II) and (III) in the present invention are those having a so-called complex compound-forming capacity. However, it is apparent that such an action is not due to only the complex compound-forming capacity of them in view of the fact that said action is not obtained from other known complex compound-forming compounds such as sodium tripolyphosphate, ethylenediamine tetraacetic acid and diethylenetriamine pentaacetate.

Sodium percarbonate and tetrasodium ethane-1,1,2,2-tetracarboxylate/hydrogen peroxide adduct used as peroxides in the present invention may be used either alone or in the form of a mixture of them. They are incorporated in the bleaching composition in an amount of 40–99.9% by weight (hereinafter referred to as %), preferably 70–95%, particularly 75–90%.

Compound of above general formula (I), (II) or (III) is incorporated in the bleaching composition in an amount of 0.1–20%, preferably 1–10%, particularly 2–6%.

The bleaching composition of the present invention may contain known components which are usually incorporated in bleaching compositions and bleaching detergent compositions, in addition to said sodium percarbonate and/or tetrasodium ethane-1,1,2,2-tetracarboxylate/hydrogen peroxide adduct and compound of above formula (I), (II) or (III). More particularly, the composition may contain a builder such as an inorganic builder, for example, a sulfate, carbonate, bicarbonate, silicate, phosphate, polyphosphate or aluminosilicate or an organic builder, for example, a citrate or ethylenediamine tetraacetate; a known stabilizer for the peroxide or hydrogen peroxide adduct such as magnesium sulfate, magnesium silicate, magnesium chloride, magnesium silicofluoride or magnesium oxide; a known activator for the peroxide or hydrogen peroxide adduct such as an N-acyl compound, organic acid anhydride or an ester. The bleaching composition may contain further an agent for preventing re-contamination such as carboxymethyl cellulose, polyvinylpyrrolidone or polyethyleneglycol, a surfactant, an enzyme, a fluorescent brightening agent, a dyestuff, a pigment, a perfume, etc.

Thus, by using the bleaching composition of the present invention, colored and figured fabrics can be bleached safely without causing discoloration or fading.

The bleaching composition of the present invention may be used solely or in combination with a known detergent composition.

The following examples illustrate the present invention concretely. The examples do not limit the invention.

EXAMPLE 1

Discoloration-and-fading Test

(i) Preparation of Colored Cloths

Cotton broadcloth #60 was dyed with Color Index Direct Blue 248 under dip dyeing conditions as shown below to obtain a colored cloth for the test for discoloration and fading:

a. Dyeing conditions:

Bath ratio: 1:20

Dye concentration: 4.0% (based on weight of fibers)

Temperature: 90° C.

Time: 45 minutes

30% (based on weight of fibers) of anhydrous Glauber's salt and 1% of sodium carbonate (based on weight of fibers) were added.

After washing with water, the cloth was further dehydrated and subjected to fixing treatment.

b. Fixing treatment conditions:

Treating agent: San Fix 555 C (a product of Sanyo Kasei Co.)

Bath ratio: 1:20

Temperature: 60° C.

Time: 20 minutes

Concentration: 3 g/liter

After washing with water, the cloth was dehydrated and dried to obtain sample cloth for the test for discoloration and fading.

(ii) Discoloration-and-fading Test

Bleaching Conditions

50 Milliliters of city water heated to 50° C. were placed in a laboratory dish (diameter: 12 cm), in which was then immersed a colored cloth (9×9 cm) for the discoloration-and-fading test. 10 Grams of a bleaching composition to be tested for discoloration and fading action were sprinkled over the cloth. Directly after the immersion for 30 minutes, the cloth was washed with water and dried. The degree of discoloration or fading was judged with the naked eye.

The results of discoloration-and-fading tests of the following bleaching compositions containing peroxides or hydrogen peroxide adducts, as bleaching agent, are shown in Table 1. It is understood that remarkable discoloration and fading actions are observed in sodium percarbonate and tetrasodium ethane-1,1,2,2-tetracarboxylate/hydrogen peroxide adduct.

Bleaching Composition

Peroxide or hydrogen peroxide adduct: 80 wt. %
Glauber's salt: 15
Magnesium silicate: 5

TABLE 1

| Bleaching agent | Degrees of discoloration and fading |
|---|---|
| Sodium percarbonate | Discoloration and fading were remarkable and the treating liquid was colored remarkably after the treatment. |
| Sodium perborate | Discoloration or fading was not recognized and the treating liquid was not colored. |
| Sodium pyrophosphate/hydrogen peroxide adduct | Discoloration or fading was not recognized and the treating liquid was not colored. |
| Glauber's salt-sodium chloride/hydrogen peroxide adduct | Discoloration or fading was not recognized and the treating liquid was not colored. |
| Tetrasodium ethane-1,1,2,2-tetracarboxylate/hydrogen peroxide adduct | Discoloration and fading were remarkable and the treating liquid was colored remarkably after the treatment. |

EXAMPLE 2

The effects of compounds of the above general formulae (I) and (II) (agents for preventing discoloration or fading of the present invention) and complex compound-forming substances of preventing discoloration and fading caused by sodium percarbonate and tetrasodium ethane-1,1,2,2-tetracarboxylate/hydrogen peroxide adduct were examined in the same manner as in Example 1 and the results were compared with each other. The bleaching compositions were as shown below.

| | |
|---|---|
| Bleaching composition A: | |
| Sodium percarbonate | 85 wt. % |
| Sodium carbonate | 4 |
| Compound of formula (I) or (II) or complex compound-forming substance | 0 or 10 |
| Magnesium silicate | 1 |
| Glauber's salt | ad 100 |
| Bleaching composition B: | |
| Tetrasodium ethane-1,1,2,2-tetracarboxylate/hydrogen peroxide adduct | 70 wt. % |
| Compound of formula (I) or (II) or complex compound-forming substance | 0 or 10 |

-continued

| | |
|---|---|
| Glauber's salt | ad 100 |

The results of bleaching compositions A and B are shown in Tables 2 and 3, respectively. It is apparent from those tables that the compositions of the present invention have remarkable effects of preventing discoloration and fading.

TABLE 2

| | Compound of formula (I) or (II) or complex compound-forming substance | Degree of discoloration or fading |
|---|---|---|
| Present invention | Sodium methyliminodiacetate | Discoloration or fading was not recognized and the treating liquid was not colored |
| | Phosphonomethyliminodiacetic acid | Discoloration or fading was not recognized and the treating liquid was not colored |
| | Phosphonoethyliminodiacetic acid | Discoloration or fading was not recognized and the treating liquid was not colored |
| | Acetamidonitrilodiacetic acid | Discoloration or fading was not recognized and the treating liquid was not colored |
| | Carboxymethliminobis (methylenephosphonic acid) triethanolamine salt | Discoloration or fading was not recognized and the treating liquid was not colored |
| | Sodium salt of carboxymethyliminobis(methylenephosphonic acid) | Discoloration or fading was not recognized and the treating liquid was not colored |
| Comparative examples | (None) | Discoloration and fading were remarkable and the treating liquid was colored remarkably. |
| | Sodium hexametaphosphate | Discoloration and fading were remarkable and the treating liquid was colored remarkably. |
| | Sodium pyrophosphate | Discoloration and fading were remarkable and the treating liquid was colored remarkably. |
| | Sodium tripolyphosphate | Discoloration and fading were remarkable and the treating liquid was colored remarkably. |
| | Ethylenediamine tetraacetic acid | Discoloration and fading were remarkable and the treating liquid was colored remarkably. |
| | Diethylenetriamine pentaacetic acid | Discoloration and fading were remarkable and the treating liquid was colored remarkably. |

TABLE 3

| | Compound of formula (I) or (II) or complex compound-forming substance | Degree of discoloration or fading |
|---|---|---|
| Present invention | Phosphonoethyliminodiacetic acid | Discoloration or fading was not recognized and the treating liquid was not colored. |
| | Acetamidonitrilodiacetic acid | Discoloration or fading was not recognized and the treating liquid was not colored. |
| | Sodium carboxymethyliminobis(methylenephosphonic acid) | Discoloration or fading was not recognized and the treating liquid was not colored. |
| | Sodium carboxyethyliminobis (methylenephosphonic acid) | Discoloration or fading was not recognized and the treating liquid was not colored. |
| Comparative examples | (None) | Discoloration and fading were remarkable and the treating liquid was colored remarkably |
| | Sodium pyrophosphate | Discoloration and fading were remarkable and the treating liquid was colored remarkably |
| | Diethylenetriamine pentaacetic acid | Discoloration and fading were remarkable and the treating liquid was colored remarkably |

EXAMPLE 3

For determining the amounts of compounds of formulae (I) and (II) used as agent for preventing discoloration or fading according to the present invention, the degrees of discoloration and fading caused by the following bleaching composition were measured in the same manner as in Example 1. The results are shown in Table 4.

Bleaching Composition

Sodium percarbonate: 70 wt. %
Compound of formula (I) or (II): 0–20
Glauber's salt: balance

TABLE 4

| Compound of formula (I) or (II) | Amount | Degree of discoloration or fading |
|---|---|---|
| Sodium methyliminodiacetate | 0 | Discoloration and fading were remarkable. |
| | 0.05 | Slight discoloration and fading were recognized. |
| | 0.1 | Discoloration or fading was not recognized. |
| | 1 | Discoloration or fading was not recognized. |
| | 5 | Discoloration or fading was not recognized. |
| | 10 | Discoloration or fading was not recognized. |
| | 20 | Discoloration or fading was not recognized. |
| Sodium acetamidonitrilodiacetate | 0 | Discoloration and fading were remarkable |
| | 0.05 | Slight discoloration and fading were recognized. |
| | 0.1 | Discoloration or fading was not recognized. |
| | 1 | Discoloration or fading was not recognized. |
| | 5 | Discoloration or fading was not recognized. |
| | 10 | Discoloration or fading was not recognized. |
| | 20 | Discoloration or fading was not recognized. |

EXAMPLE 4

Color Change and Fading Tests

(I) Preparation of Colored Cloth

A cotton knit cloth was dyed with Color Index Direct Blue 248 under the following dip dyeing conditions to obtain a dyed cloth sample for color change and fading tests.

a. Dyeing Conditions

Bath ratio: 1:20
Dye concentration: 4.0% (based on weight of the cloth)
Temperature: 90° C.
Time: 45 Minutes 30% (Based on weight of cloth) of anhydrous Glauber's salt and 1% (based on weight of cloth) of sodium carbonate were added thereto.

After washing with water followed by dehydration, the product was subjected to fixing treatment.

b. Fixing Treatment Conditions

Treating agent: Sanfix 555C (a product of Sanyo Kasei Co.)
Bath ratio: 1:20
Temperature: 60° C.
Time: 20 Minutes
Concentration: 3 g/liter The treated cloth was washed with water, dehydrated and dried.

After ironing the cloth, a dyed cloth sample for color change and fading tests was obtained.

(II) Color Change and Fading Tests

Bleaching Conditions

One gram of a bleaching composition containing sodium percarbonate was dissolved in 200 ml of city water warmed to 40° C. One piece of said dyed cloth (9×9 cm) prepared as above was immersed in that solution for 30 minutes.

After the immersion, the cloth was washed with water and dried. This procedure was repeated five times. Color change and fading of the treated cloth and coloring of the treating solution were examined with the naked eye.

With a bleaching composition comprising the following components, color change and fading test was effected under the above described bleaching conditions. The results are shown in Table 5.

Sodium percarbonate $2Na_2CO_3.3H_2O_2$: 80 wt. %
Compound of general formula (III) or another compound: 10 wt. %
Sodium tripolyphosphate: 10 wt. %

TABLE 5

| | Compound of general formula (III) or another compound | Degree of color change or fading |
|---|---|---|
| Present invention | Sodium hydroxyethyliminodiacetate | No color change or fading was caused and the treating solution was not colored. |
| | Sodium hydroxyethylethylenediamine triacetate | No color change or fading was caused and the treating solution was not colored. |
| Comparative examples | None* | Color change and fading were remarkable. Coloring of the treating solution was remarkable. |
| | Sodium tripolyphosphate | Color change and fading were remarkable. Coloring of the treating solution was remarkable. |
| | Sodium ethylenediaminetetraacetate | Color change and fading were remarkable. Coloring of the treating solution was remarkable. |
| | Sodium diethylenetriaminepentaacetate | Color change and fading were remarkable. Coloring of the treating solution was remarkable. |

*In this case, 0.9 g of the composition was used in the test.

EXAMPLE 5

The effects of various salts of compounds of general formula (III) of preventing color change and fading were examined. The bleaching composition was as follows:

Bleaching composition

Sodium percarbonate: 85 wt. %
Sodium pyrophosphate: 5 wt. %
Compound of general formula (III): 10 wt. %

The results are shown in Table 6.

TABLE 6

| | Comound of general formula (III) | Degree of color change or fading |
|---|---|---|
| Present invention | Calcium hydroxyethyliminodiacetate | No color change or fading was caused and the treating solution was not colored. |
| | Magnesium hydroxyethyliminodiacetate | No color change or fading was caused and the treating solution was not colored. |
| | Barium hydroxyethylethylenediaminetriacetate | No color change or fading was caused and the treating solution was not colored. |
| | Magnesium hydroxyethylethylenediamine triacetate | No color change or fading was caused and the treating solution was not colored. |
| | Lithium hydroxyethyliminodiacetate | No color change or fading was caused and the treating solution was not colored. |
| | Barium hydroxyethylaminodiacetate | No color change or fading was caused and the treating solution was not colored. |
| | Lithium hydroxyethylethylenediaminetriacetate | No color change or fading was caused and the treating solution was not colored. |

EXAMPLE 6

For determining the necessary amount of the compound of general formula (III) used as an agent for preventing color change or fading according to the present invention, the effects of the following bleaching compositions for preventing color change or fading were examined:

Bleaching Composition

Sodium percarbonate: 80 wt. %
Synthetic Zeolite A-4 (a product of Tekko-sha): 10 wt. %
Compound of general formula (III): 1–10 wt. %
Glauber's salt: ad 100

The results are shown in Table 7.

TABLE 7

| | Compound of general formula (III) | Amount (%) | Degree of color change and fading |
|---|---|---|---|
| Present invention | Lithium hydroxyethylimiodiacetate | 10 | No color change or fading was caused and the treating solution was not colored. |
| | Lithium hydroxyethyliminodiacetate | 6 | No color change or fading was caused and the treating solution was not colored. |
| | Lithium hydroxyethyliminodiacetate | 2 | No color change or fading was caused and the treating solution was not colored. |
| | Lithium hydroxyethyliminodiacetate | 1 | Slight color change and fading were recognized. |
| | Magnesium hydroxyethylethylenediamine triacetate | 10 | No color change or fading was caused and the treating solution was not colored. |
| | Magnesium hydroxyethylethylenediamine triacetate | 6 | No color change or fading was caused and the treating solution was not colored. |
| | Magnesium hydroxyethylethylenediamine triacetate | 6 | No color change or fading was caused and the treating solution was not colored. |
| | Magnesium hydroxethylethylenediamine triacetate | 2 | No color change or fading was caused and the treating solution |

TABLE 7-continued

| Compound of general formula (III) | Amount (%) | Degree of color change and fading |
|---|---|---|
| | | was not colored. |
| Magnesium hydroxyethyl- | 1 | Slight color change and fading were recognized. |
| Magnesium hydroxyethyl-iminodiacetate | 10 | No color change or fading was caused and the treating solution was not colored. |
| Magnesium hydroxyethyl-iminodiacetate | 6 | No color change or fading was caused and the treating solution was not colored. |
| Magnesium hydroxyethyl-iminodiacetate | 2 | No color change or fading was caused and the treating solution was not colored. |
| Magnesium hydroxyethyl-iminodiacetate | 1 | Slight color change and fading were recognized. |

EXAMPLE 7

The following bleaching compositions containing the agents for preventing color change or fading were stored at 50° C. for 20 days.

The results are shown in Table 8.

Bleaching Composition

Sodium percarbonate: 80 wt. %
Sodium carbonate: 10 wt. %
Compound of general formula (III) or another compound: 10 wt. %

TABLE 8

| | Compound of general formula (III) or another compound | Appearance and smell of the powder |
|---|---|---|
| Present invention | Lithium hydroxyethylimino-diacetate | No coloring or offensive smell |
| | Magnesium hydroxyethylimino-diacetate | No coloring or offensive smell |
| | Magnesium hydroxyethyl-ethylenediamine triacetate | No coloring or offensive smell |
| Comparative examples | Sodium salicylaldoxime | Coloring was remarkable and offensive smell was emitted. |
| | Sodium 8 hydroxyquinoline | Coloring was remarkable and offensive smell was emitted. |

We claim:

1. A bleaching composition consisting essentially of (A) one or both of sodium percarbonate and a tetrasodium ethane-1,1,2,2-tetracarboxylate/hydrogen peroxide adduct, and (B) at least one compound of the formulae (I), (II) and (III):

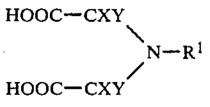

(I)

-continued

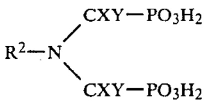

(II)

wherein X and Y each represent hydrogen or an alkyl group of 1-5 carbon atoms, $R^1$ represents an alkyl group of 1-5 carbon atoms, an acyl group of 1-5 carbon atoms or a phosphonoalkylene group of 1-5 carbon atoms, $R^2$ represents a carboxyalkylene group of 1-5 carbon atoms, and their alkali metal salts, alkaline earth metal salts, ammonium salts and alkylolamine salts having an alkyl group of 2 or 3 carbon atoms, and

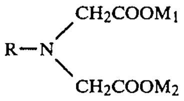

(III)

wherein R represents $HOCH_2CH_2$— or

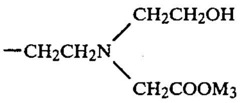

and $M_1$, $M_2$ and $M_3$ represents an alkali metal or an alkaline earth metal.

2. A bleaching composition according to claim 1, in which the component (B) is at least one compound of the formulae (I) and (II).

3. A bleaching composition according to claim 1, in which the component (B) is at least one compound of the formula (III).

4. A bleaching composition according to claim 2 which contains 40–99.9 wt. % of component (A) and 0.1–20 wt. % of component (B)

5. A bleaching composition according to claim 4 which contains 1–10 wt. % of component (B).

6. A bleaching composition according to claim 2 wherein the compound of formula (I) or (II) is selected from the group consisting of methyliminodiacetic acid, phosphonomethyliminodiacetic acid, phosphonoethyliminodiacetic acid, acetamidonitrilodiacetic acid, carboxyethyliminobis(methylenephosphonic acid) and carboxymethyliminobis(methylenephosphonic acid) and their alkali metal salts, alkaline earth metal salts and alkylolamine salts having an alkyl group of 2–3 carbon atoms.

7. A bleaching composition according to claim 2 which contains 70–95 wt. % of sodium percarbonate and 1–10 wt. % of sodium methyliminodiacetate.

8. A bleaching composition according to claim 3 which contains 70–95 weight % of component (A) and 1–10 weight % of component (B).

9. A bleaching composition according to claim 3 wherein component (A) is sodium percarbonate.

10. A bleaching composition according to claim 3 wherein the compound of formula (III) is a lithium salt.

11. A bleaching composition according to claim 3 wherein the compound of general formula (III) is a magnesium salt or barium salt.

12. A bleaching composition according to claim 3 wherein R in formula (III) is $HOCH_2CH_2$—.

* * * * *